E. EMMERT.
Cultivator.
No 29,368.
Patented July 31, 1860.
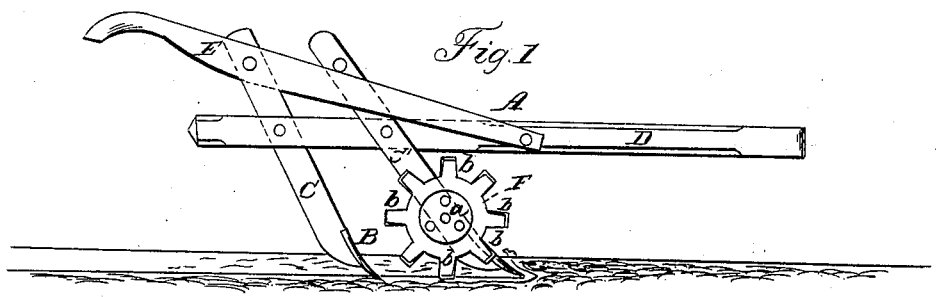
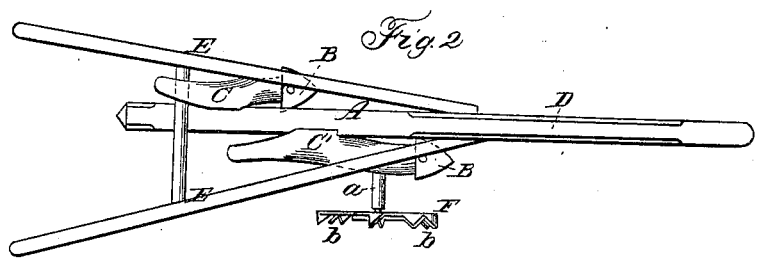
Witnesses
J W Coombs
R S Spencer
Inventor
E Emmert
per Munn & Co
Attys

UNITED STATES PATENT OFFICE.

EZRA EMMERT, OF FRANKLIN GROVE, ILLINOIS.

IMPROVEMENT IN CULTIVATORS.

Specification forming part of Letters Patent No. 29,368, dated July 31, 1860.

*To all whom it may concern:*

Be it known that I, EZRA EMMERT, of Franklin Grove, in the county of Lee and State of Illinois, have invented a new and Improved Plow; and I do hereby declare that the following is a full, clear, and exact description of the same, reference being had to the accompanying drawings, forming a part of this specification, in which—

Figure 1 represents a side elevation of my invention. Fig. 2 is a plan or top view of the same.

Similar letters of reference in both views indicate corresponding parts.

This invention consists in the combination, with an ordinary shovel-plow or cultivator, of a wheel rotating on the side of the plow, and provided with hoes on its edge for the purpose of preventing the plow from covering the growing plants as it is drawn forward, and also for the purpose of giving steadiness to the plow and of enabling the attendant to guide it more readily, and at the same time for the purpose of digging up and pulverizing the soil around the roots of the growing plants.

To enable those skilled in the art to make and use my invention, I will proceed to describe its construction and operation, with reference to the drawings.

A represents an ordinary shovel-plow or cultivator. The shovels B are secured to the standards C C′, which are rigidly attached to the beam D, and the plow is guided by the handles E in the usual manner. In drawing such a plow through between the rows of corn or other growing crops—such as cotton, sugar-cane, or root-plants—the shovels are very liable to throw the soil over the plants and to cover them up, to the great detriment of their growth, and it requires a very experienced hand and constant attention to guide the plow and to keep it steady between the rows so as to turn up the soil between the rows without injury to the plants. These difficulties are in a great measure overcome by my improvement. The wheel F turns on an axle, $a$, which is secured to the forward standard, C″, so that said wheel runs close up to the plants, and that it prevents the clods and large lumps thrown up by the shovels falling on the growing plants. The wheel F is provided with hoes $b$ on its circumference, which serve to pulverize and to dig up the ground around the roots of the plants, so that the shovels can be kept at the proper distance from the roots, and yet the soil around said roots is perfectly dug up. By these means the attendant has it completely in his power to run the plow as close up to the plants as necessary, and by having the wheel on the side he is enabled to keep the plow perfectly steady and to carry it straight through the rows without the slightest injury to the plants.

Having thus fully described my invention, what I claim as new, and desire to secure by Letters Patent, is—

The combination, with an ordinary shovel-plow or cultivator, A, of a rotary wheel, E, furnished with hoes $b$, and operating in the manner and for the purpose specified.

EZRA EMMERT.

Witnesses:
   H. R. WITT,
   D. B. McKENNEY.